United States Patent
Hartgrove

(10) Patent No.: US 6,815,378 B1
(45) Date of Patent: Nov. 9, 2004

(54) ABRASION RESISTANT AND DRAPEABLE NONWOVEN FABRIC

(75) Inventor: Herbert Parks Hartgrove, Angier, NC (US)

(73) Assignee: Polymer Group, Inc., North Charleston, SC (US)

( * ) Notice: Subject to any disclaimer, the term of this patent is extended or adjusted under 35 U.S.C. 154(b) by 84 days.

(21) Appl. No.: 09/658,763

(22) Filed: Sep. 8, 2000

(51) Int. Cl.$^7$ ............................ B32B 5/14; B32B 27/04; D04H 1/46

(52) U.S. Cl. ........................ 442/104; 442/408; 428/171; 428/172

(58) Field of Search ................................ 442/104, 408, 442/327, 384, 359; 428/170–172; 28/104

(56) References Cited

U.S. PATENT DOCUMENTS

| 3,485,706 | A | | 12/1969 | Evans | 428/134 |
| 3,966,406 | A | * | 6/1976 | Namiki et al. | 8/636 |
| 3,988,343 | A | * | 10/1976 | Lilyquist | 524/89 |
| 4,341,571 | A | * | 7/1982 | Hiss et al. | 438/197 |
| 4,941,884 | A | | 7/1990 | Green | 8/120 |
| 5,098,764 | A | * | 3/1992 | Bassett et al. | 428/131 |
| 5,266,354 | A | * | 11/1993 | Tohyama et al. | 427/203 |
| 5,393,304 | A | | 2/1995 | Vuillaume et al. | 8/194 |
| 5,440,771 | A | | 8/1995 | Georgantas | 8/149.3 |
| 5,478,635 | A | | 12/1995 | Travis et al. | 428/221 |
| 5,503,899 | A | * | 4/1996 | Ashida et al. | 428/151 |
| 5,632,072 | A | | 5/1997 | Simon et al. | |
| 5,822,833 | A | * | 10/1998 | James et al. | 28/105 |
| 5,874,159 | A | * | 2/1999 | Cruise et al. | 428/198 |

FOREIGN PATENT DOCUMENTS

| EP | 564306 | 10/1993 |
| WO | WO 01/53578 | 7/2001 |

* cited by examiner

Primary Examiner—Cheryl A. Juska
Assistant Examiner—Jenna-Leigh Befumo
(74) Attorney, Agent, or Firm—Wood, Phillips, Katz, Clark & Mortimer

(57) ABSTRACT

A method of forming abrasion resistant nonwoven fabrics by hydroentanglement includes providing a precursor web. The precursor web is subjected to hydroentanglement on a three-dimensional image transfer device to create a patterned and imaged fabric. Treatment with an initial pre-dye finish enhances the integrity of the fabric, permitting the nonwoven to exhibit desired physical characteristics, including strength, durability, softness, and drapeability. The pre-dye finish treated nonwoven may then be dyed by means applicable to conventional wovens. A post-dye finish may then be applied to further enhance the performance of the nonwoven fabric.

11 Claims, 4 Drawing Sheets

SECTION A-A

SECT. A - A

SECT. B - B

ABRASION RESISTANT AND DRAPEABLE NONWOVEN FABRIC

TECHNICAL FIELD

The present invention relates generally to methods of making nonwoven fabrics, and more particularly to a method of manufacturing a nonwoven fabric exhibiting improved physical characteristics while retaining aesthetic appeal, permitting use of the fabric in a wide variety of consumer applications.

BACKGROUND OF THE INVENTION

The production of conventional textile fabrics is known to be a complex, multi-step process. The production of fabrics from staple fibers begins with the carding process where the fibers are opened and aligned into a feed stock known as sliver. Several strands of sliver are then drawn multiple times on drawing frames to further align the fibers, blend, improve uniformity as well as reduce the diameter of the sliver. The drawn sliver is then fed into a roving frame to produce roving by further reducing its diameter as well as imparting a slight false twist. The roving is then fed into the spinning frame where it is spun into yarn. The yarns are next placed onto a winder where they are transferred into larger packages. The yarn is then ready to be used to create a fabric.

For a woven fabric, the yarns are designated for specific use as warp or fill yarns. The fill yarn packages (which run in the cross direction and are known as picks) are taken straight to the loom for weaving. The warp yarns (which run on in the machine direction and are known as ends) must be further processed. The packages of warp yarns are used to build a warp beam. Here the packages are placed onto a warper which feeds multiple yarn ends onto the beam in a parallel array. The warp beam yarns are then run through a slasher where a water soluble sizing is applied to the yarns to stiffen them and improve abrasion resistance during the remainder of the weaving process. The yarns are wound onto a loom beam as they exit the slasher, which is then mounted onto the back of the loom. Here the warp and fill yarns are interwoven in a complex process to produce yardages of cloth.

In contrast, the production of nonwoven fabrics from staple fibers is known to be more efficient than traditional textile processes as the fabrics are produced directly from the carding process.

Nonwoven fabrics are suitable for use in a wide-variety of applications where the efficiency with which the fabrics can be manufactured provides a significant economic advantage for these fabrics versus traditional textiles. However, nonwoven fabrics have commonly been disadvantaged when fabric properties are compared, particularly in terms of surface abrasion, pilling and durability in multiple-use applications. Hydroentangled fabrics have been developed with improved properties, which are a result of the entanglement of the fibers or filaments in the fabric providing improved fabric integrity. Subsequent to entanglement, fabric durability can be further enhanced by the application of binder compositions and/or by thermal stabilization of the entangled fibrous matrix. However, the use of such means to obtain fabric durability come at the cost of a stiffer and less appealing fabric.

U.S. Pat. No. 3,485,706, to Evans, hereby incorporated by reference, discloses processes for effecting hydroentanglement of nonwoven fabrics. More recently, hydroentanglement techniques have been developed which impart images or patterns to the entangled fabric by effecting hydroentanglement on three-dimensional image transfer devices. Such three-dimensional image transfer devices are disclosed in U.S. Pat. No. 5,098,764, hereby incorporated by reference, with the use of such image transfer devices being desirable for providing a fabric with enhanced physical properties as well as an aesthetically pleasing appearance.

Heretofore, attempts have been made to develop nonwoven fabrics exhibiting the necessary aesthetic and physical properties. U.S. Pat. No. 5,393,304, discloses a washable spunlaced nonwoven cloth, with this patent contemplating use of a PAE binder composition (polyamide-amine-epichorohydrin) with inclusion of cotton fiber in the fibrous matrix.

U.S. Pat. No. 3,988,343, discloses a nylon fabric treated with a mixture of acrylic polymer and latex binder with tinting pigments. U.S. Pat. No. 5,874,159 contemplates providing a spunlaced fabric structure with durability by the provision of a bonding material in the form of a thermal plastic polymer, which may be provided in the form of a net, an apertured or punctured film, or molten drop form. The bonding material acts to join layers or laminations from which the fabric is formed.

For specific applications, a nonwoven fabric must exhibit a combination of specific physical characteristics. As an example, fabrics used in apparel should be soft and drapeable, yet withstand home laundering, and be resistant to abrasion (which can result in aesthetically displeasing fabric "pills"). Fabrics used in the fabrication of apparel must also exhibit sufficient strength, tear resistance, and colorfastness to ensure a reasonable life span for the end-use article. The physical performance of a fabric in terms of liquid handling, i.e. perspiration control, is of utmost concern when apparel fabricated from such fabric is to be worn for extended lengths of time. These are among the characteristics which have been identified as being desirable for apparel applications including outerwear, workwear, footwear, and the like.

U.S. Pat. No. 5,478,635, discloses a knitted nylon fabric, necessary for abrasion resistance, being adhesively affixed to a nylon nonwoven fabric "reservoir". The construction of this laminate structure requires the knitting of nylon yarn followed by the application of polyurethane adhesive dissolved in a highly volatile solvent such as methylene chloride. U.S. Pat. No. 4,941,884 is directed to a method of fabricating an abrasion resistant woven material having good aesthetics.

Notwithstanding various attempts in the prior art to develop a nonwoven fabric acceptable for apparel use applications, a need continues to exist for a nonwoven fabric exhibiting aesthetic appeal while obtaining requisite mechanical characteristics.

SUMMARY OF THE INVENTION

In accordance with the present invention, a method of making a nonwoven fabric embodying the present invention includes the steps of providing a precursor web comprising a fibrous matrix. While use of staple length fibers is typical, the fibrous matrix may comprise substantially continuous filaments and combinations thereof. In a particularly preferred form, the fibrous matrix is carded and cross-lapped to form a precursor web. It is also preferred that the precursor web be subjected to pre-entangling on a foraminous forming surface prior to imaging and patterning.

The present method further contemplates the provision of a three-dimensional image transfer device having a movable imaging surface. In a typical configuration, the image transfer device may comprise a drum-like apparatus that is rotatable with respect to one or more hydroentangling manifolds.

The precursor web is advanced onto the imaging surface of the image transfer device so that the web moves together with the imaging surface. Hydroentanglement of the precursor web is effected to form an imaged and patterned fabric.

Subsequent to hydroentanglement, the imaged and patterned fabric may be subjected to one or more variety of post-entanglement treatments. Such treatments include application of a pre-dyeing finish, dyeing of the fabric by conventional textile dyeing methods, and optionally, a subsequent post-dyeing finish.

A further aspect of the present invention is directed to a method of forming a durable nonwoven fabric which exhibits an enhanced degree of softness and drapeability, while providing the necessary high resistance to tearing and abrasion, to facilitate use in a wide variety of applications. The fabric exhibits a high degree of absorbency, thus permitting its use in apparel applications in which the fabric can quickly and effectively remove moisture, thus improving wearer comfort.

A method of making the present durable nonwoven fabric comprises the steps of providing a precursor web that is subjected to hydroentangling. Polyester precursor webs, in either homogeneous form or formed as a blend with other polymeric and/or natural fibers, have been found to desirably yield soft hand and good fabric drapeability. The precursor web is formed into an imaged and patterned nonwoven fabric by hydroentanglement on a three-dimensional image transfer device. The image transfer device defines three-dimensional elements against which the precursor web is forced during hydroentangling, whereby the fibrous constituents of the web are imaged and patterned by movement into regions between the three-dimensional elements of the transfer device.

In the preferred form, the precursor web is hydroentangled on a foraminous surface prior to hydroentangling on the image transfer device. This pre-entangling of the precursor web acts to partially integrate the fibrous components of the web, but does not impart imaging and patterning as can be achieved through the use of the three-dimensional image transfer device.

Subsequent to hydroentangling, the imaged and patterned nonwoven fabric is treated with a pre-dye finish to lend further integrity to the fabric structure. The polymeric binder composition is selected to enhance durability characteristics of the fabric, while maintaining the desired softness and drapeability of the patterned and imaged fabric.

Other features and advantages of the present invention will become readily apparent from the following detailed description, the accompanying drawings, and the appended claims.

BRIEF DESCRIPTION OF THE DRAWINGS

The invention will be more easily understood by a detailed explanation of the invention including drawings. Accordingly, drawings which are particularly suited for explaining the invention are attached herewith; however, is should be understood that such drawings are for explanation purposes only and are not necessarily to scale. The drawings are briefly described as follows.

DETAILED DESCRIPTION

Figure 1:
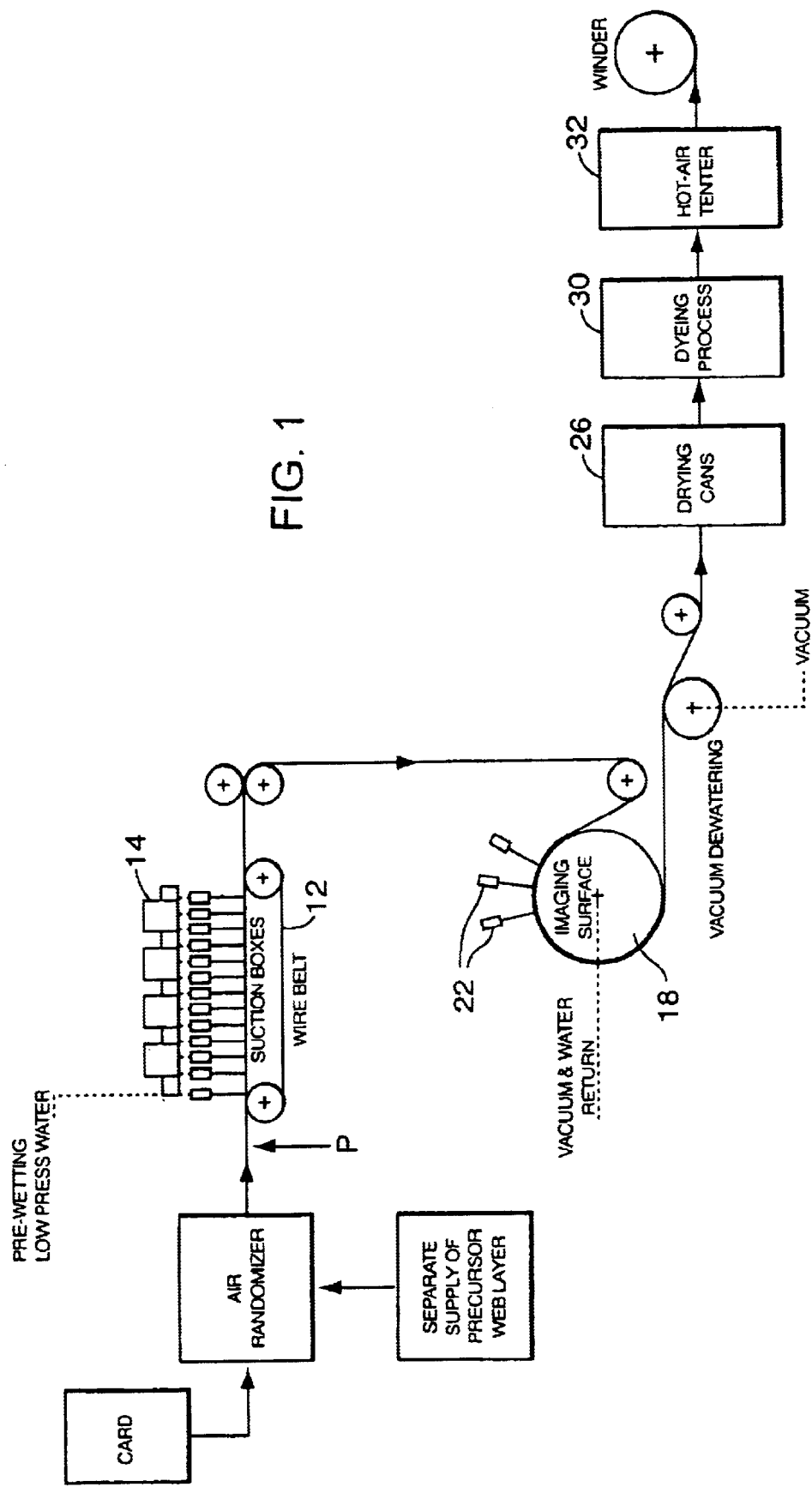
FIG. 1 is a diagrammatic view of an apparatus for manufacturing a durable nonwoven fabric, embodying the principles of the present invention.

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

In accordance with the present invention, a durable nonwoven fabric can be produced which can be employed in apparel applications, with the fabric exhibiting sufficient softness, drapeability, abrasion resistance, strength, and tear resistance, with colorfastness to light, crocking, and laundering. It has been difficult to develop nonwoven fabrics which achieve the desired hand, drape, and pill resistance that is inherent in woven fabrics. Typically, nonwoven fabrics in the 3.0 to 6.0 ounces per square yard range exhibit bulkiness, which in turn detracts from the hand and drapeability of the fabric.

In the case where nonwoven fabrics are produced using staple length fibers, the fabric typically has a degree of exposed surface fibers that will abrade or "pill" if not sufficiently entangled, and/or not treated with the appropriate polymer chemistries subsequent to hydroentanglement. The present invention provides a finished fabric that can be conveniently cut, sewn, and packaged for retail sale or utilized as a component in the fabrication of a more complex article. The cost associated with designing/weaving, fabric preparation, dyeing and finishing steps can be desirably reduced.

With reference to FIG. 1, therein is illustrated an apparatus for practicing the present method for forming a nonwoven fabric. The fabric is formed from a fibrous matrix preferably comprising staple length fibers, but it is within the purview of the present invention that different types of fibers, or fiber blends, and/or continuous filaments can be employed. The fibrous matrix is preferably carded and cross-lapped to form a precursor web, designated P. In current embodiments, the precursor web comprises both 100% staple length polyester fibers and polyester/nylon staple length fiber blends.

FIG. 1 illustrates a hydroentangling apparatus for forming nonwoven fabrics in accordance with the present invention.

The apparatus includes a foraminous forming surface in the form of belt 12 upon which the precursor web P is positioned for pre-entangling by entangling manifold 14.

The entangling apparatus of FIG. 1 further includes an imaging and patterning drum 18 comprising a three-dimensional image transfer device for effecting imaging and patterning of the lightly entangled precursor web. The image transfer device includes a moveable imaging surface which moves relative to a plurality of entangling manifolds 22 which act in cooperation with three-dimensional elements defined by the imaging surface of the image transfer device to effect imaging and patterning of the fabric being formed.

Manufacture of a durable nonwoven fabric embodying the principles of the present invention is initiated by providing the precursor nonwoven web, preferably in the form of a 100% polyester or polyester blend. The use of the polyester desirably provides drape, which upon treatment with the specific binder formulation listed herein, results in a material with improved physical properties over the competitive 100% nylon material. During invention development, fibrous layer ratios varying from 100 percent polyester by weight to 50 percent polyester/50 percent nylon by weight were produced and tested. Such blending of the layers in the precursor web was also found to yield aesthetically pleasing color variations due to the differential absorption of dyes during the dyeing steps.

EXAMPLES

Example 1

Using a forming apparatus as illustrated in FIG. 1, a nonwoven fabric was made in accordance with the present invention by providing a precursor web comprising Type 54W polyester fiber, 1.1 denier by 2.0 inch staple length, as obtained from Wellman. The web had a basis weight of 2.0 ounces per square yard (plus or minus 7%). The precursor web was 100% carded and cross-lapped, with a draft ratio of 2.5 to 1.

The precursor web then received thereupon a 1.5 oz of air-randomized Type T200 Nylon, 1.8 denier by 2.0 staple length, as obtained from Du Pont. Prior to patterning and imaging of the precursor web, the web was entangled by a series of entangling manifolds such as diagrammatically illustrated in FIG. 1. FIG. 1 illustrates disposition of precursor web P on a foraminous forming surface in the form of belt 12, with the web acted upon by an entangling manifolds 14. In the present examples, each of the entangling manifolds included 3 orifice strips each having 120 micron orifices spaced at 42.3 per inch, with the manifolds successively operated at 100, 300, 800 and 800 psi, at a line speed of 50 feet per minute.

The entangling apparatus of FIG. 1 further includes an imaging and patterning drum 18 comprising a three-dimensional image transfer device for effecting imaging and patterning of the now-entangled precursor web. The entangling apparatus includes a plurality of entangling manifolds 22 that act in cooperation with the three-dimensional image transfer device of drum 18 to effect patterning of the fabric. In the present example, the three entangling manifolds 22 were operated at 1900 psi, at a line speed which was the same as that used during pre-entanglement.

The three-dimensional image transfer device of drum 18 was configured as a so-called octagon and square, as illustrated in FIGS. 4, 4a, 4b, and 4c.

Subsequent to patterned hydroentanglement, the fabric was dried on three consecutive steam cans at 300° F. at 26, then received a substantially uniform application by dip and nip saturation of a pre-dye finish composition at application station 30. The web was then directed through a tenter apparatus 32, operated at 300° F.

In the present example, the pre-dye finish composition was applied at a line speed of 50 feet per minute, with a nip pressure of 40 psi and percent wet pick up of approximately 120%.

The pre-dye finish formulation, by weight percent of bath, was as follows:

| | |
|---|---|
| Water | 83.4% |
| Y30 | 0.1% |
| (Y30 is a silicone-based defamer) | |
| As may be obtained from Down Corning of Michigan | |
| Hystretch V29 | 16.0% |
| (Hystretch is an elastomeric polymer emulsion) | |
| Registered to B. F. Goodrich of New York | |
| Freecat 187 | 0.02% |
| (Freecat is a chemical catalyst) | |
| Registered to Freedom Textile Chemicals Co. of North Carolina | |
| Tween 20 | 0.2% |
| (Tween is a wetting and dispersing agent) | |
| Registered to ICI Americas, Inc. of Delaware | |
| Cymel 303 | 0.24% |
| (Cymel is a melamine cross-linking resin) | |
| Registered to American Cyanamid Co. of New York | |

After pre-dye finish application and curing of the finish on the imaged nonwoven fabric, the resulting fabric was dyed. Various dyeing methods commonly known in the art are applicable including nip, pad, and jet, with the use of a jet apparatus and disperse dyes, as represented by U.S. Pat. Nos. 5,440,771 and 3,966,406, both hereby incorporated by reference, being most preferred.

Figure 2:
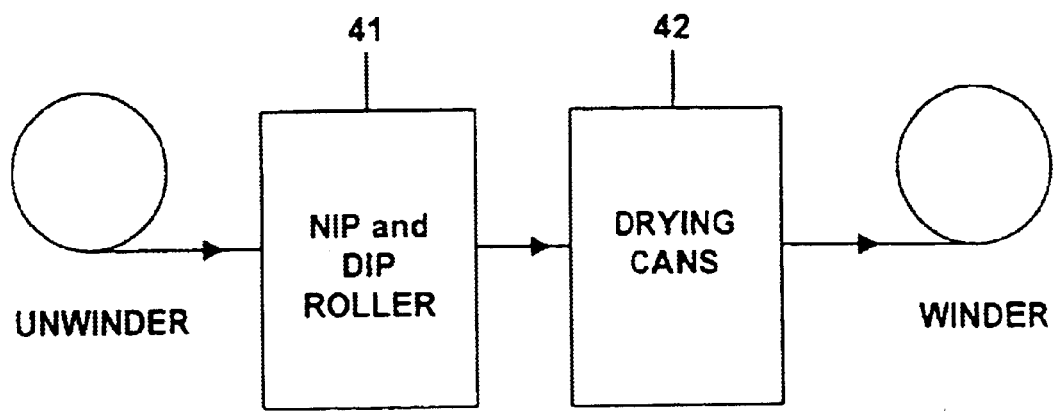
FIG. 2 is a diagrammatic view of an apparatus for the application of a post-dye finish onto a nonwoven fabric, embodying the principles of the present invention.

Subsequent to dyeing of the imaged fabric, the fabric was dried on three consecutive steam cans at 300° F. and rewound. The now dyed nonwoven fabric then received a substantially uniform application by dip and nip saturation, depicted in FIG. 2, of a post-dye finish composition at application station 41. The post-dye finish composition was applied at a line speed of 50 feet per minute, with a nip pressure of 40 psi and percent wet pick up of approximately 120%.

The post-dye finish composition formulation, by weight percent of bath, was as follows:

| | |
|---|---|
| Water | 97.8% |
| RU40-350 | 2.0% |
| (RU40-350 is a polycarbonate resin) | |
| As may be obtained from Stahl, USA of Massachusetts | |
| XR-2569 | 0.2% |
| (XR-2569 is a carbodimide crosslinker) | |
| As may be obtained from Stahl, USA of Massachusetts | |

The final fabric was dried on steam cans 42 at 300° F.

Example 2

A fabric as made in the manner described in Example 1, whereby in the alternative the polyester precursor web reduced to a basis weight of 1.75 ounce, being formed by carding and air-randomization. In place of the 1.8 denier nylon fiber, an air randomized 1.1 denier by 2.0 inch staple length Type T200 Nylon at a 1.5 ounce basis weight was used.

Example 3

A fabric as made in the manner described in EXAMPLE 1, whereby in the alternative, a 100% Type 54W polyester fiber, 1.1 denier by 2.0 inch staple length, was formed into a precursor web at a basis weight of 4.0 ounces per square yard (plus or minus 7%). In the present example, the entangling manifolds 22 were operated at 4500 psi, at a line speed of 50 feet per minute.

Figure 3:
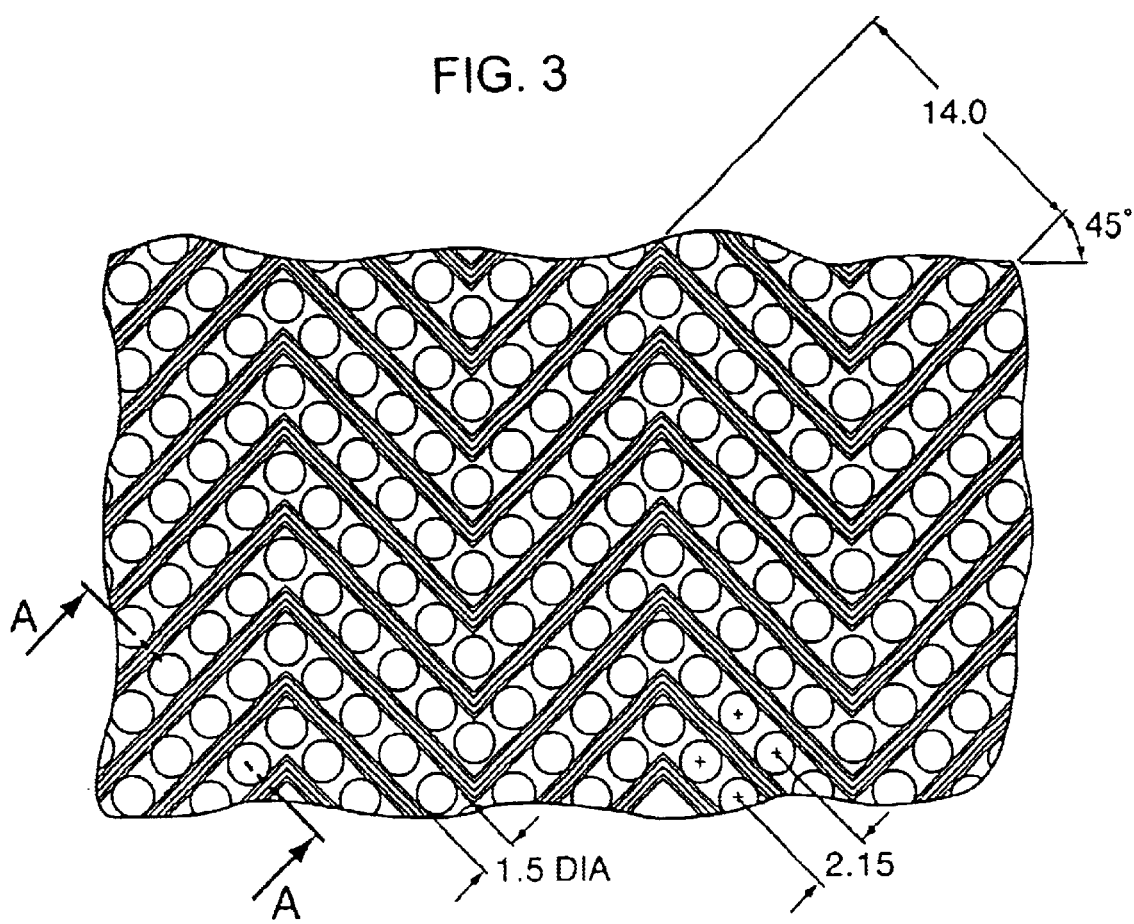
FIG. 3 is a fragmentary top plan view of a three-dimensional image transfer device of the type used for practicing the present invention, referred to as "mini-herringbone", with approximate dimensions shown in millimeters.
Figure 3A:
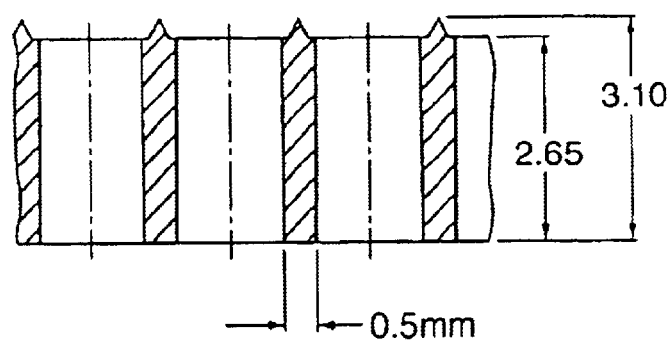
FIG. 3a is a cross-sectional view taken along lines A—A of FIG. 3.
Figure 4:
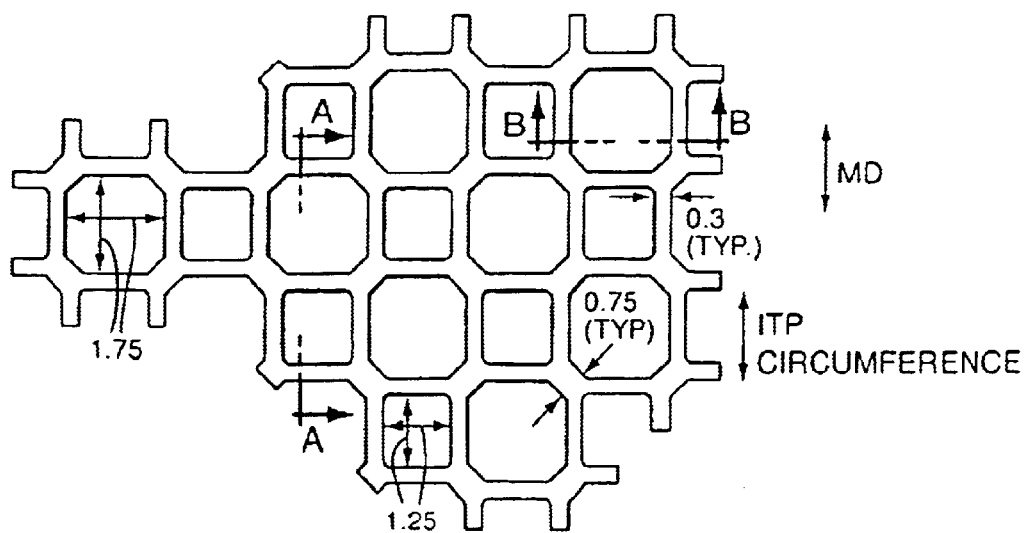
FIG. 4 is a fragmentary top plan view of a three-dimensional image transfer device of the type used for practicing the present invention, referred to as "octagons and squares", with approximate dimensions shown in millimeters.
Figure 4A:
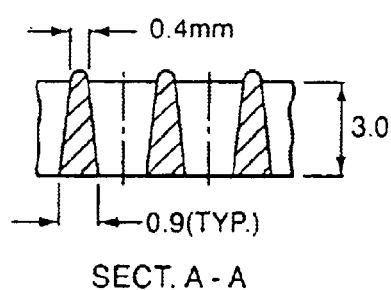
FIG. 4a is a cross-sectional view taken along lines A—A of FIG. 4.
Figure 4B:
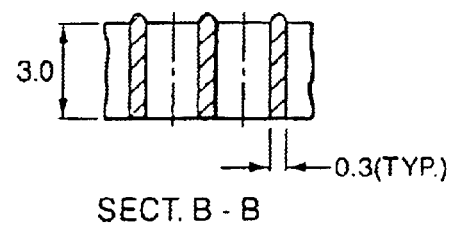
FIG. 4b is a cross-sectional view taken along lines B—B of FIG. 4.
Figure 4C:
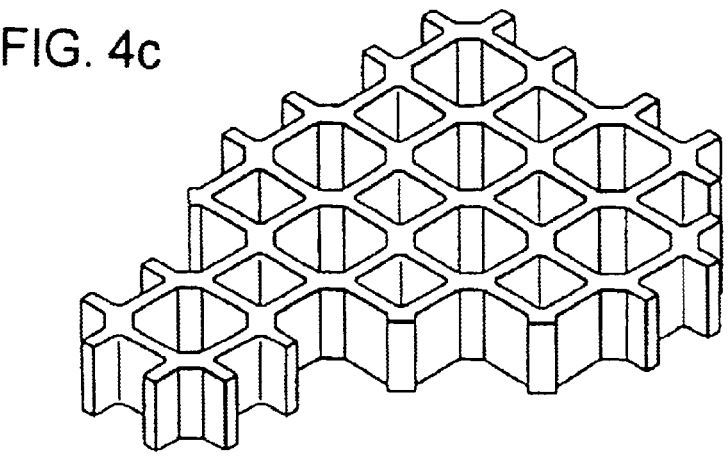
FIG. 4c is an isometric view of three-dimensional image transfer device shown in FIG. 4.

The three-dimensional image transfer device of drum 24 was configured as a so-called mini-herringbone, as illustrated in FIGS. 3 and 3a.

In the present example, the pre-dye finish composition was again applied at a line speed of 50 feet per minute, with a nip pressure of 40 psi and percent wet pick up of approximately 120%.

The pre-dye finish composition formulation, by weight percent of bath, was as follows:

| | |
|---|---|
| Water | 73.6% |
| Y30 | 0.1% |
| Tween 20 | 0.2% |
| Rhoplex TR934HS | 15.0% |
| (TR934HS is an acrylic/copolymer emulsion) | |
| Registered to Rhom & Haas Co. of Delaware | |
| Rhoplex TR407 | 10.0% |
| (TR407 is an acrylic/copolymer emulsion) | |
| Ammonia | 0.1% |
| Sancure 861 | 1.0% |
| (Sancure is a water-based urethane resin) | |
| Registered to Sanncor Industries, Inc. of Massachusetts | |

The following benchmarks have been established in connection with nonwoven fabrics, which exhibit the desired combination of durability, softness, abrasion resistance, etc., for certain apparel and home use applications.

| | |
|---|---|
| Fabric Strength/Elongation | ASTM D5034 |
| Absorbency - Capacity | ASTM D1117 |
| Elmendorf Tear | ASTM D5734 |
| Handle-o-meter | ASTM D2923 |
| Stiffness - Cantilever Bend | ASTM D5732 |
| Thermal Shrink | Specified Below |
| Fabric Weight | ASTM D3776 |
| Martindale Abrasion Test | ASTM D4970 |
| Colorfastness to Crocking | AATCC 8-1988 |

Thermal shrinkage is determined by initially cutting 11 inch by 11 inch square samples of the test fabric, the samples being taken at a minimum of 4 inches from the edge of the fabric roll. Indelible reference markings are directly indicated on the sample at a 1 inch increment from each corner, a 9 inch span being centrally located on each edge of the sample resulting. The samples are then placed in an operating convention style oven of which has obtained and is maintaining a 350° F. temperature. The samples are incubated for 30 minutes. At the conclusion of the incubation period, the samples are removed and allowed to cool on a flat surface until the samples reach ambient temperature. Samples are remeasured against the said reference markings. The difference between the final measure and the initial measure is presented in the form of a percent change.

The test data in Table 1 shows that nonwoven fabrics approaching, meeting, or exceeding the various above-described benchmarks for fabric performance in general, and to commercially available products in specific, can be achieved with fabrics formed in accordance with the present invention. Fabrics having basis weights between about 2.0 ounces per square yard and 6.0 ounces per square yard are preferred, with fabrics having basis weights of about 3.0 ounces per square yard and 4.0 ounces per square yard being most preferred. Fabrics formed in accordance with the present invention are durable and drapeable, and are suitable for apparel applications.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

TABLE 1

| Type | | | | | Inventive Material | | | Commercial Material Cambrelle.RTM |
|---|---|---|---|---|---|---|---|---|
| | | | | | Sample 1 | Sample 2 | Sample 3 | Of Camtex, Inc. |
| Weight | | | | ounces/yard² | 3.83 | 3.59 | 5.95 | 3.49 |
| Bulk | | | | mils | 34.3 | 34.0 | 50.3 | 24.5 |
| STRIP | TENSILE | MD | | lbs. | 35.83 | 48.68 | 65.58 | 24.37 |
| | | CD | | | 28.15 | 33.78 | 47.29 | 24.16 |
| | Combined Tensile/gram | | | | 0.45 | 0.62 | 0.51 | 0.37 |
| | ELONGATION | MD | | % | 58.95 | 49.84 | 54.35 | 40.28 |
| | | CD | | | 94.65 | 71.99 | 78.28 | 39.93 |
| GRAB | TENSILE | MD | | lbs. | 72.58 | 92.21 | 123.4 | 62.45 |
| | | CD | | | 67.50 | 82.73 | 91.73 | 57.46 |
| | Combined Tensile/gram | | | | 0.58 | 1.31 | 0.97 | 0.92 |
| | ELONGATION | MD | | % | 59.59 | 49.88 | 49.76 | 40.79 |
| | | CD | | | 100.3 | 74.1 | 75.55 | 40.13 |
| | Absorbency | | CAP | % | 672 | 748 | Buoyant | 529 |
| | | | TIME | sec | 19 | 15 | Buoyant | 166 |
| | Absorbency/sec/gram fabric | | | | 0.25 | 0.37 | | 0.02 |
| Color Fastness | | | WET | | 5 | 5 | 5 | 4.5 |
| | | | DRY | | 5 | 5 | 5 | 4.5 |

TABLE 1-continued

| Type | | | Inventive Material | | | Commercial Material Cambrelle.RTM |
|---|---|---|---|---|---|---|
| | | | Sample 1 | Sample 2 | Sample 3 | Of Camtex, Inc. |
| Handle-O-Meter | MD | grams | 111 | 116 | 370 | 302 |
| | CD | | 52 | 77 | 172 | 96 |
| Combined/gram force/gram fabric | | | 1.14 | 1.45 | 2.45 | 3.06 |
| Cantilever Bend | MD | mg-cm | 8.8 | 8.5 | 10.6 | 9.7 |
| | CD | | 5.7 | 6.3 | 7.1 | 6.9 |
| Bend/bulk | | | 0.42 | 0.44 | 0.35 | 0.68 |
| Thermal Shrink | MD | % | −3 | 1.7 | −3 | −4 |
| (250° F. for 30 min) | CD | | −1.5 | 0 | −5.3 | −5 |
| Elmendorf Tear | MD | grams | 2331 | 2451 | 3417 | 1084 |
| | CD | | 2209 | 3223 | 4269 | 1410 |
| Combined gram force/gram fabric | | | 32 | 42 | 35 | 19 |
| Martindale Abrasion | | cycles | >50,000 | >50,000 | >50,000 | >50,000 |

What is claimed:

1. A durable nonwoven fabric, comprising:

a) a precursor web comprising polyester fibers;

b) said precursor web being imaged and patterned by hydroentanglement on a three-dimensional image transfer device to form a nonwoven fabric;

c) said nonwoven fabric receiving a substantially uniform, saturation application of a pre-dye finish comprising an elastomeric polymer emulsion followed by a curing step, said finish being formulated and applied in a sufficient quantity to enhance abrasion resistance properties of said nonwoven fabric;

d) dyeing of said nonwoven fabric;

e) the resulting nonwoven fabric exhibiting a final basis weight of between about 2.0 ounces and 6.0 ounces, a Martindale Abrasion Value of at least 50,000 cycles, a combined drape value of less than 2.45 grams force per gram fabric weight and a combined bend value of less than 0.42 milligram-centimeter per mil thickness, and a color fastness under wet test conditions of at least 5, and a color fastness under dry test conditions of at least 5.

2. A durable nonwoven fabric as in claim 1, said precursor web comprising layers of said polyester fibers.

3. A durable nonwoven fabric as in claim 1, said precursor web comprising layers of said polyester fibers and layers of nylon fibers.

4. A durable nonwoven fabric as in claim 1, said nonwoven fabric exhibiting a final basis weight of between about 3.0 ounces and about 4.0 ounces.

5. A durable nonwoven fabric as in claim 1, said nonwoven fabric exhibiting a combined Elmendorf tear value of at least about 32 grams force per gram fabric weight.

6. A durable nonwoven fabric as in claim 1, said nonwoven fabric exhibiting an absorbency of at least about 0.25 percent capacity per second per gram fabric weight.

7. A durable nonwoven fabric as in claim 1, said nonwoven fabric is further processed by receiving a substantially uniform application of a post-dye finish.

8. A durable nonwoven fabric as in claim 1, said nonwoven fabric is used in the fabrication of apparel.

9. A durable nonwoven fabric as in claim 1, wherein said pre-dye finish comprises a chemical catalyst.

10. A durable nonwoven fabric as in claim 1, wherein said pre-dye finish comprises a wetting and dispersing agent.

11. A durable nonwoven fabric as in claim 1, wherein said pre-dye finish comprises a melamine cross-linking resin.

* * * * *